US011179802B2

(12) United States Patent
Nakamura et al.

(10) Patent No.: US 11,179,802 B2
(45) Date of Patent: Nov. 23, 2021

(54) LASER MACHINING HEAD AND LASER MACHINING APPARATUS

(71) Applicant: Mitsubishi Electric Corporation, Chiyoda-ku (JP)

(72) Inventors: Naoyuki Nakamura, Tokyo (JP); Masaki Seguchi, Tokyo (JP); Tomotaka Katsura, Tokyo (JP); Daiji Morita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 405 days.

(21) Appl. No.: 16/307,188

(22) PCT Filed: Jul. 5, 2017

(86) PCT No.: PCT/JP2017/024704
§ 371 (c)(1),
(2) Date: Dec. 5, 2018

(87) PCT Pub. No.: WO2018/012379
PCT Pub. Date: Jan. 18, 2018

(65) Prior Publication Data
US 2019/0126395 A1 May 2, 2019

(30) Foreign Application Priority Data
Jul. 14, 2016 (JP) .............................. JP2016-139569

(51) Int. Cl.
*B23K 26/06* (2014.01)
*B23K 26/38* (2014.01)
(Continued)

(52) U.S. Cl.
CPC .......... *B23K 26/0648* (2013.01); *B23K 26/04* (2013.01); *B23K 26/0665* (2013.01);
(Continued)

(58) Field of Classification Search
CPC .. B23K 26/0648; B23K 26/082; B23K 26/21; B23K 26/04; B23K 26/0665; B23K 26/36; B23K 26/38
See application file for complete search history.

(56) References Cited

U.S. PATENT DOCUMENTS 6,635,849 B1 * 10/2003 Okawa ................. B23K 26/043
219/121.7
2005/0035102 A1 * 2/2005 Amako ................ B23K 1/0056
219/121.73

(Continued)

FOREIGN PATENT DOCUMENTS

CN  1337896 A  2/2002
JP  2005-205464 A  8/2005
(Continued)

OTHER PUBLICATIONS

Japanese Office Action dated May 21, 2019 in Japanese Patent Application No. 2018-527549 (with unedited computer-generated English translation), 5 pages.

(Continued)

*Primary Examiner* — Brian W Jennison
(74) *Attorney, Agent, or Firm* — Xsensus LLP

(57) ABSTRACT

A laser machining apparatus includes: a laser oscillator that emits laser light having a plurality of wavelengths; a transmission diffractive optical element that allows the laser light to pass therethrough; a machining lens that concentrates the laser light that has passed through the transmission diffractive optical element; a distance adjustment mechanism that changes a distance between the transmission diffractive optical element and the machining lens; and an angle adjustment mechanism that changes an angle of the transmission diffractive optical element to switch between a state in which the laser light is dispersed by the transmission diffractive optical element and then enters the machining (Continued)

lens and a state in which the laser light enters the machining lens without being dispersed by the transmission diffractive optical element.

8 Claims, 13 Drawing Sheets

(51) Int. Cl.
*B23K 26/082* (2014.01)
*B23K 26/04* (2014.01)
*B23K 26/21* (2014.01)
*B23K 26/36* (2014.01)

(52) U.S. Cl.
CPC ............ *B23K 26/082* (2015.10); *B23K 26/21* (2015.10); *B23K 26/36* (2013.01); *B23K 26/38* (2013.01)

(56) References Cited

U.S. PATENT DOCUMENTS

| | | | |
|---|---|---|---|
| 2012/0111840 | A1 | 5/2012 | Nomaru |
| 2017/0259374 | A1 | 9/2017 | Takiguchi |
| 2017/0279245 | A1* | 9/2017 | Usuda ................ H01S 5/042 |

FOREIGN PATENT DOCUMENTS

| | | | |
|---|---|---|---|
| JP | 2011-79057 | A | 4/2011 |
| JP | 2012-96274 | A | 5/2012 |
| JP | 2015-44238 | A | 3/2015 |
| JP | 2016055319 | A | 4/2016 |
| JP | 2016-78047 | A | 5/2016 |
| WO | WO 2005/084874 | A1 | 9/2005 |

OTHER PUBLICATIONS

Office Action dated Dec. 2, 2020 in Chinese Patent Application No. 201780042779.5, 16 pages.
International Search Report dated Oct. 3, 2017 in PCT/JP/2017/024704 filed Jul. 5, 2017.
Chinese Office Action dated Apr. 29, 2020, issued in corresponding Chinese Patent Application No. 201780042779.5, 16 pages.

\* cited by examiner

BEAM SHAPE AT FOCAL POSITION

BEAM SHAPE AT FOCAL POSITION

BEAM SHAPE AT FOCAL POSITION

BEAM SHAPE AT FOCAL POSITION

BEAM SHAPE AT FOCAL POSITION

BEAM SHAPE AT FOCAL POSITION

BEAM SHAPE AT FOCAL POSITION

BEAM SHAPE AT FOCAL POSITION

BEAM SHAPE AT FOCAL POSITION

OPTICAL AXIS POSITION

ROTATION ANGLE OF
TRANSMISSION
DIFFRACTIVE OPTICAL
ELEMENT: A
ROTATION ANGLE OF
POLARIZING PLATE: a

OPTICAL AXIS POSITION

ROTATION ANGLE OF
TRANSMISSION
DIFFRACTIVE OPTICAL
ELEMENT: B
ROTATION ANGLE OF
POLARIZING PLATE: a

OPTICAL AXIS POSITION

ROTATION ANGLE OF
TRANSMISSION
DIFFRACTIVE OPTICAL
ELEMENT: B
ROTATION ANGLE OF
POLARIZING PLATE: b

OPTICAL AXIS POSITION

ROTATION ANGLE OF
TRANSMISSION
DIFFRACTIVE OPTICAL
ELEMENT: C
ROTATION ANGLE OF
POLARIZING PLATE: c

BEAM SHAPE AT FOCAL POSITION

BEAM SHAPE AT FOCAL POSITION

BEAM SHAPE AT FOCAL POSITION

LASER MACHINING HEAD AND LASER MACHINING APPARATUS

FIELD

The present invention relates to a laser machining apparatus.

BACKGROUND

Speed and quality of laser machining can be improved by adjusting the shape of a beam or the intensity distribution of a beam directed at a machining target. Examples of the adjustment of a beam shape or a beam intensity distribution can include adjustment of the beam shape in a planar direction of a workpiece, such as cutting in a donut mode by using an axicon lens, and cutting with the beam intensity distribution adjusted in a laser emission direction using a bifocal lens.

In Patent Literature 1, a technique is disclosed that directs laser light having a plurality of wavelengths at a diffractive optical element and causes a condenser lens to concentrate the laser light diffracted by the diffractive optical element so that beams split by wavelength are directed at a machining target.

In Patent Literature 2, a technique is disclosed that includes a laser output device that oscillates laser light having a plurality of wavelength bands and an emission head that concentrates components of the laser light having respective wavelength bands on an identical optical axis with shifted focal lengths and emits the resultant light; this technique improves machining productivity by aligning the focal position of a component of the laser light having a long wavelength of 940 nm to the workpiece position and concentrating a component of the laser light having a short wavelength of 808 nm with the focal point of the component having the long wavelength inside the component having the short wavelength.

CITATION LIST

Patent Literature

Patent Literature 1: Japanese Patent Application Laid-open No. 2005-205464
Patent Literature 2: Japanese Patent Application Laid-open No. 2015-44238

SUMMARY

Technical Problem

To improve the productivity, it is necessary to concentrate laser light into one point for cutting a thin plate or making a hole and, when cutting a thick plate, to switch to laser light having a beam shape and intensity distribution suitable for the thickness and material of the thick plate. Although the techniques described in Patent Literatures 1 and 2 are expected to increase the speed for cutting a thick plate, they may suffer reduced efficiency when cutting a thin plate or making a hole because they cannot switch the laser light as described above and thus cannot concentrate the beam into one point, reducing the overall productivity in some cases. Additionally, when the beam shape or the intensity distribution has anisotropy as in the case with Patent Literature 1, the beam shape needs to be changed in accordance with the machining direction. These switching operations need to be performed quickly; however, it is difficult to achieve such swift switching using a single laser wavelength and a single optical element.

The present invention has been achieved in view of the above, and an object of the present invention is to provide a laser machining apparatus that enables quick switching between a beam shape suitable for cutting a thin plate and making a hole and a beam shape suitable for cutting a thick plate.

Solution to Problem

To solve the problems described above and achieve the object described above, the laser machining apparatus according to the present invention includes: a laser oscillator that emits laser light having a plurality of wavelengths; a diffractive optical element that allows the laser light to pass through the diffractive optical element; and a machining lens that concentrates the laser light that has passed through the diffractive optical element. The laser machining apparatus according to the present invention includes: a distance adjustment mechanism that changes a distance between the diffractive optical element and the machining lens; and an angle adjustment mechanism that changes an angle of the diffractive optical element.

Advantageous Effects of Invention

The present invention produces an effect of providing a laser machining apparatus that enables quick switching between a beam shape suitable for cutting a thin plate and making a hole, and a beam shape suitable for cutting a thick plate.

DESCRIPTION OF EMBODIMENTS

Exemplary embodiments of a laser machining apparatus according to the present invention will be described in detail below with reference to the drawings. The present invention is not limited to the embodiments.

First Embodiment

Figure 1:
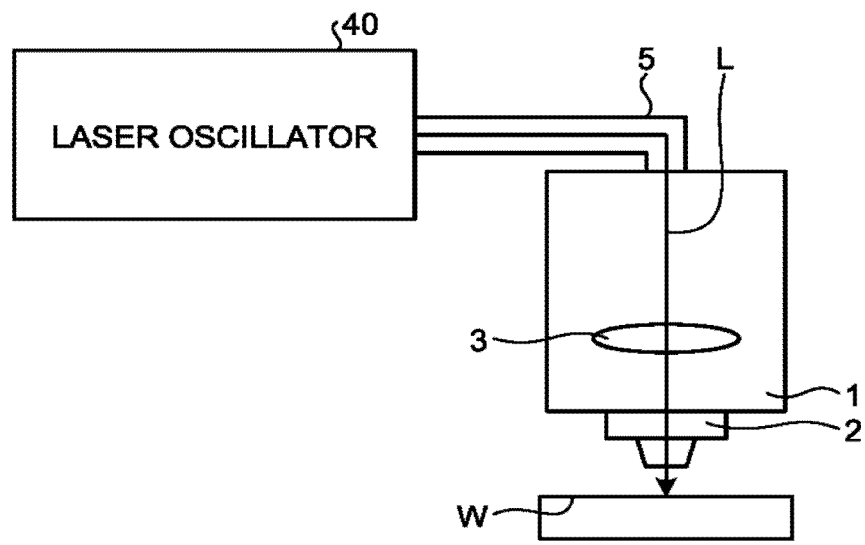
FIG. 1 is a diagram schematically illustrating a laser machining apparatus according to a first embodiment of the present invention.

FIG. 1 is a diagram schematically illustrating a laser machining apparatus according to a first embodiment of the present invention. Laser light L having a plurality of wavelengths is emitted from a laser oscillator 40, is transmitted through a transmission fiber 5 into a machining head 1, and passes through a machining lens 3 placed in the machining head 1 and through a nozzle 2, such that the laser light L that is concentrated is directed at a workpiece W together with an undepicted machining gas that is supplied into the machining head 1. By moving at least one of the machining head 1 and the workpiece W, relative positions of the machining head 1 and the workpiece W can be changed arbitrarily.

Figure 2:
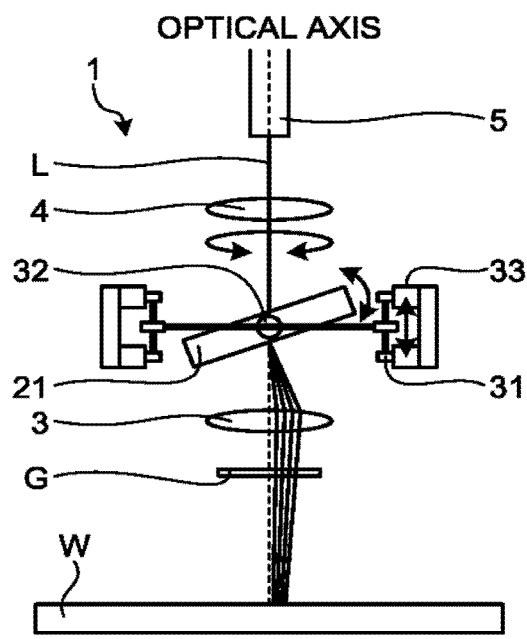
FIG. 2 is a diagram illustrating an internal configuration of a machining head of the laser machining apparatus according to the first embodiment and a beam shape at a focal position in a workpiece planar direction.
Figure 2:
Figure 3:
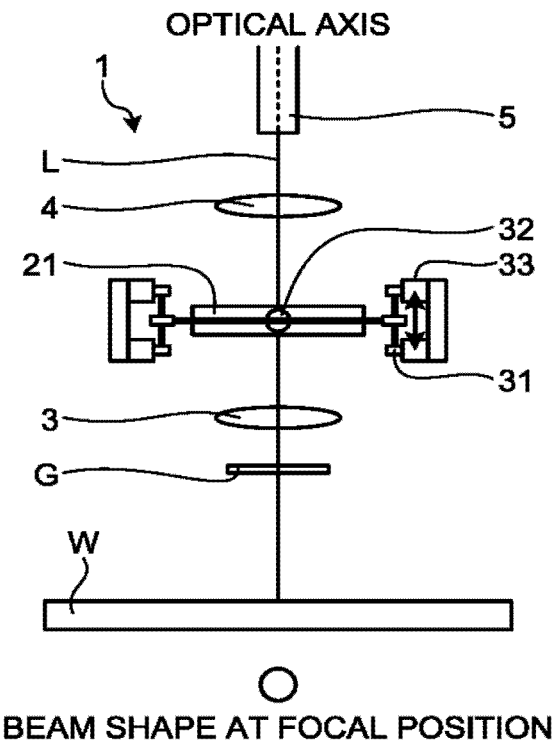
FIG. 3 is a diagram illustrating the internal configuration of the machining head of the laser machining apparatus according to the first embodiment and a beam shape at the focal position in the workpiece planar direction.

FIGS. 2 and 3 are diagrams illustrating an internal configuration of the machining head of the laser machining apparatus according to the first embodiment and beam shapes at a focal position in a workpiece planar direction. The nozzle 2, which is not an optical element, is omitted in FIGS. 2 and 3. The laser light L having the plurality of wavelengths and emitted from the laser oscillator 40 illustrated in FIG. 1 is transmitted through the transmission fiber 5 into the machining head 1. The laser light L, which is transmitted into the machining head 1, is collimated by a collimating lens 4, passes through a transmission diffractive optical element 21, is directed at the machining lens 3, and then is transmitted by a protective glass G, such that the laser light L that is concentrated is directed at the workpiece W. Prevented by the protective glass G from entering a machining lens 3 side, the machining gas, which is supplied into the machining head 1, passes through the nozzle 2 and supplied to the workpiece W. A distance adjustment mechanism 31 can change a distance from the transmission diffractive optical element 21 to the machining lens 3. An angle adjustment mechanism 32 can change an inclination of the transmission diffractive optical element 21 with respect to the laser light L. The angle adjustment mechanism 32 also serves as a switching mechanism that switches between a state in which the laser light L is dispersed by the transmission diffractive optical element 21 and then enters the machining lens 3 and a state in which the laser light L enters the machining lens 3 without being dispersed by the transmission diffractive optical element 21. A rotation mechanism 33 can rotate the transmission diffractive optical element 21 within a plane perpendicular to an optical axis.

The laser light L having the plurality of wavelengths is, when passing through the transmission diffractive optical element 21, dispersed at diffraction angles corresponding to the wavelengths and enters the machining lens 3. Incidence angles on the machining lens 3 differ depending on the wavelengths; thus, components of the laser light L that have the respective wavelengths are concentrated at locations corresponding to the respective incidence angles at the focal position of the machining lens 3. As illustrated in FIG. 2, the workpiece W is thus irradiated with beams that spread in a direction of dispersion achieved by the transmission diffractive optical element 21, with the components of the laser light L having the plurality of wavelengths overlapping with each other. As illustrated in FIG. 3, when an incidence angle of the laser light L on the transmission diffractive optical element 21 is perpendicular, no diffraction occurs, causing the laser light L having the plurality of wavelengths to enter the machining lens 3 without being dispersed. The laser light L directed at the workpiece W is concentrated into one point in this case.

On the transmission diffractive optical element 21, an incidence angle α formed between incident light and a normal line to a diffraction grating and a diffraction angle β formed between diffracted light and the normal line to the diffraction grating satisfy a relation described in equation (1) below.

$$\sin \alpha - \sin \beta = Nm\lambda \quad (1)$$

[N: number of slits per 1 mm, m: order of diffraction (=0, ±1, ±2 . . . ), λ: wavelength]

When, for example, m=1 in equation (1) described above, a different diffraction angle β exists for each wavelength; in conditions that no solution exists except m=0, the laser light L travels in a straight line without dispersion. FIG. 2 describes a condition that the only solution that exists is m=1 in equation (1), that is, a condition that the diffracted light is concentrated on the first order; FIG. 3 describes a condition that the solution of |m|≥1 does not exists. The angle adjustment mechanism 32 can change the incidence angle α of the laser light L on the transmission diffractive optical element 21 and thereby switch between the state illustrated in FIG. 2 in which diffraction occurs and the state illustrated in FIG. 3 in which no diffraction occurs.

To cut a thick plate with high quality, it is necessary to widen a slit width for cutting and thereby efficiently discharge dross, which is metal melted by irradiation with the laser light L. For this purpose, it is a common practice to enlarge the diameter of a beam of the laser light L directed at the workpiece W in cutting a thick plate. In contrast, it is known that speed of machining can be improved by reducing the diameter of a beam of the laser light L directed at the workpiece W in cutting a thin plate or piercing. The angle adjustment mechanism 32 can change the incidence angle of the laser light L on the transmission diffractive optical element 21 and thereby can switch between the presence and absence of dispersion of the laser light L entering the machining lens 3; thus, the laser machining apparatus according to the first embodiment enables selection of the state illustrated in FIG. 2 in which diffraction occurs when, for example, cutting a thick plate and selection of the state illustrated in FIG. 3 in which no diffraction occurs when cutting a thin plate or performing piercing, thus achieving the machining efficiently. Additionally, the laser machining apparatus according to the first embodiment switches between the state in which the diffraction of the laser light L occurs and the state in which no diffraction occurs may be possible by only changing the angle of the transmission diffractive optical element 21, thereby achieving the switching in a short time and thus enabling improvement in productivity of the overall machining.

Figure 4:
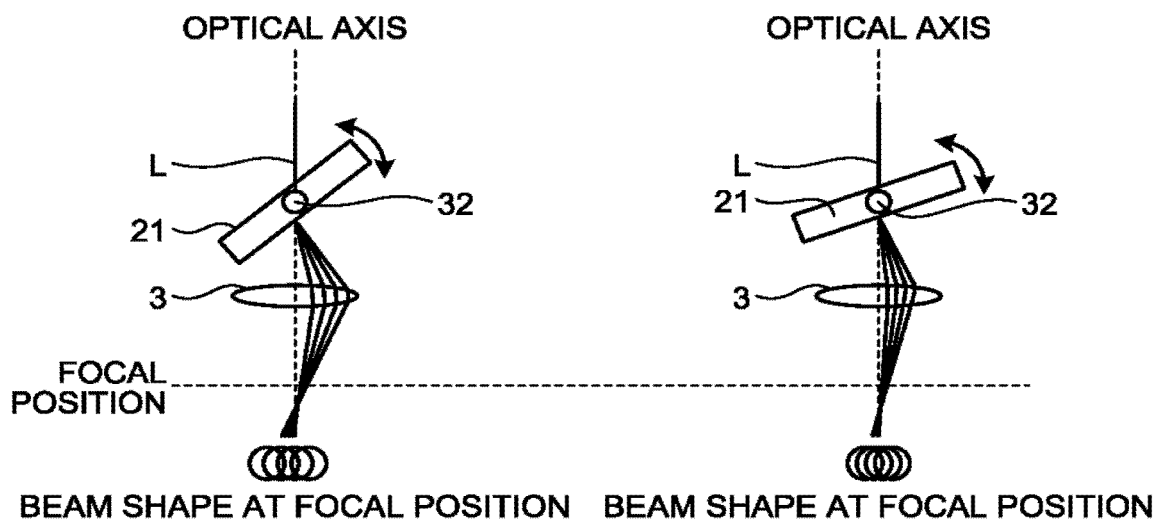
FIG. 4 is a diagram illustrating laser light exhibited when an angle of a transmission diffractive optical element is changed by an angle adjustment mechanism of the laser machining apparatus according to the first embodiment.

FIG. 4 is a diagram illustrating laser light exhibited when the angle of the transmission diffractive optical element is changed by the angle adjustment mechanism of the laser machining apparatus according to the first embodiment. As illustrated in FIG. 4, by adjusting the incidence angle of the laser light L on the transmission diffractive optical element 21 using the angle adjustment mechanism 32, angles of components of the laser light L that are dispersed by wavelength by the transmission diffractive optical element 21 can be changed. This enables adjustment of proportions of overlaps between the beams of the laser light L directed at the workpiece W, thereby enabling selection of a beam shape in accordance with the thickness and material of the workpiece W.

Figure 5:
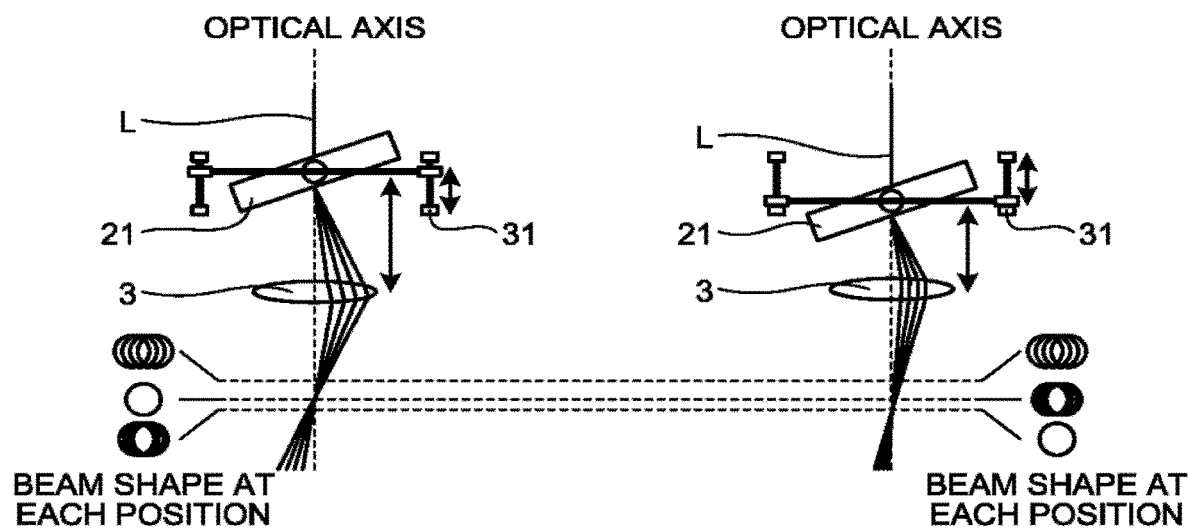
FIG. 5 is a diagram illustrating laser light exhibited when a distance from the transmission diffractive optical element to the machining lens is changed by a distance adjustment mechanism of the laser machining apparatus according to the first embodiment.

FIG. 5 is a diagram illustrating laser light exhibited when the distance from the transmission diffractive optical element to the machining lens is changed by the distance adjustment mechanism of the laser machining apparatus according to the first embodiment. In FIG. 5, while the diffraction angles of the components having respective wavelengths achieved by the transmission diffractive optical element 21 are not changed, positions in which the components of the laser light L dispersed by wavelength reach the machining lens 3 are changed. Concentration positions of components of the laser light L at the focal position of the machining lens 3 are determined by only the incidence angles on the machining lens 3; thus, a change in distance from the transmission diffractive optical element 21 to the machining lens 3 does not change irradiation positions of the dispersed components of the laser light L and thus does not change the proportions of overlaps between the beams at the focal position. However, the positions in which the components of the laser light L dispersed by wavelength reach the machining lens 3 changes; thus, the proportions of overlaps of the laser light L are changed with respect to the laser emission direction, and thereby a beam intensity distribution with respect to a thickness direction of the workpiece W can be adjusted. Additionally, combining the angle adjustment mechanism 32 in FIG. 4 and the distance adjustment mechanism 31 in FIG. 5 enables change of the beam shape and the beam intensity distribution in the workpiece planar direction and the workpiece thickness direction in accordance with the thickness and material of the workpiece, thereby performing the machining efficiently. Furthermore, use of the transmission diffractive optical element 21 enables placement of an optical element at the center of the optical axis of the laser light L, enabling reduction in size of the machining head 1.

Figure 6:
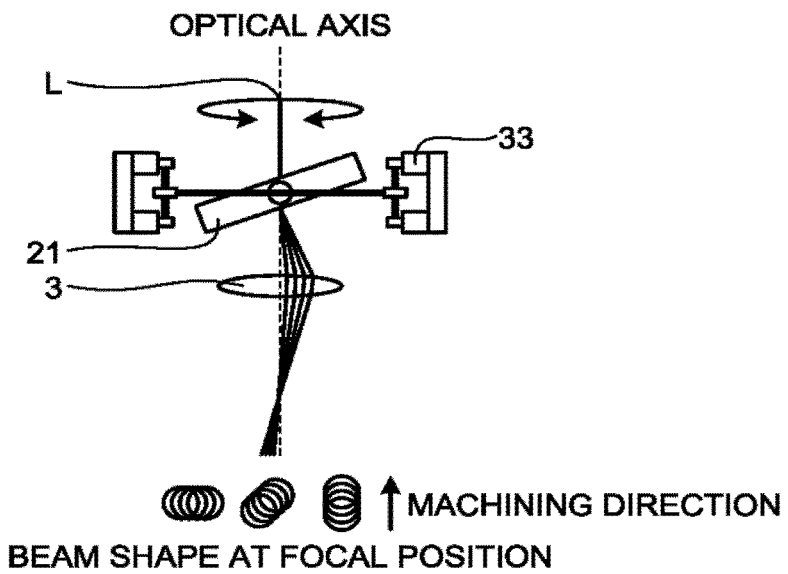
FIG. 6 is a diagram illustrating laser light exhibited when the transmission diffractive optical element is rotated within a plane perpendicular to the optical axis by a rotation mechanism of the laser machining apparatus according to the first embodiment.
Figure 7:
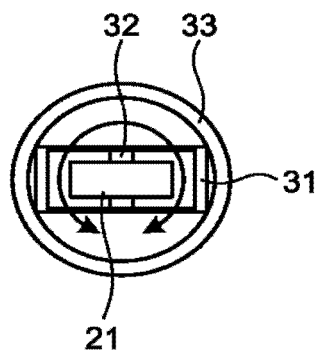
FIG. 7 is a top view of the rotation mechanism of the laser machining apparatus according to the first embodiment.

FIG. 6 is a diagram illustrating laser light exhibited when the transmission diffractive optical element is rotated within a plane perpendicular to the optical axis by the rotation mechanism of the laser machining apparatus according to the first embodiment. FIG. 7 is a top view of the rotation mechanism of the laser machining apparatus according to the first embodiment. A diffraction direction achieved by the transmission diffractive optical element 21 is determined by an orientation of a periodic structure that configures a diffraction grating; thus, by rotating the transmission diffractive optical element 21 within a plane perpendicular to the optical axis using the rotation mechanism 33, a dispersion direction of the laser light L with respect to the workpiece W can be changed. By adjusting the rotation mechanism 33 such that the dispersion direction of the laser light L is consistent with respect to a machining direction, machining can be performed on an arbitrary shape while the machining speed and cutting quality are maintained.

While the laser oscillator 40, which generates a plurality of wavelengths, has been described in the first embodiment, a plurality of laser oscillators that each of them generates different wavelength may be used such that beams emitted from each of the oscillators are combined and transmitted to the machining head 1. Alternatively, a laser oscillator that generates a wide laser wavelength spectrum, such as a laser diode, may be used. In other words, a laser oscillator that emits laser light L having a wavelength width may be used;

specifically, a laser oscillator that generates a wavelength width equal to or greater than 10 nm can be used.

The distance adjustment mechanism 31 may be a mechanism that can change the distance from the transmission diffractive optical element 21 to the machining lens 3; for example, a distance adjustment mechanism 31 may be placed on each of the transmission diffractive optical element 21 and the machining lens 3 such that the distance from the transmission diffractive optical element 21 to the machining lens 3 and a distance from the machining lens 3 to the workpiece W are adjusted individually.

The angle adjustment mechanism 32 may be a mechanism configured to change the incidence angle of the laser light L on the transmission diffractive optical element 21; for example, a reflecting mirror may be placed between the transmission diffractive optical element 21 and the collimating lens 4, and the angle of the reflecting mirror may be adjusted.

Additionally, the rotation mechanism 33 may be a mechanism configured to keep the diffraction direction of the laser light L achieved by the transmission diffractive optical element 21 consistent with respect to the machining direction; for example, the rotation mechanism 33 may be placed on the machining head 1 such that the entire machining head 1 is rotated in accordance with the machining direction, or the workpiece W itself may be rotated in accordance with the machining direction.

The laser machining apparatus according to the first embodiment enables quick switching between a beam shape suitable for cutting a thin plate and making a hole, and a beam shape suitable for cutting a thick plate.

Second Embodiment

Figure 8:
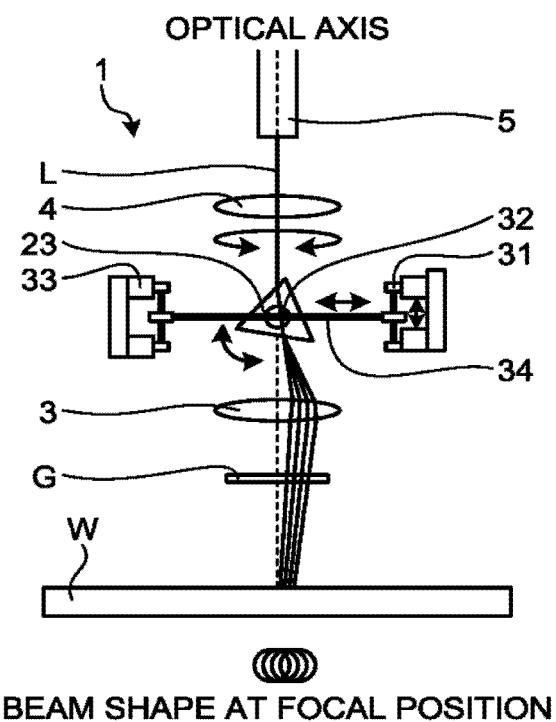
FIG. 8 is a diagram schematically illustrating the machining head of a laser machining apparatus according to a second embodiment of the present invention.
Figure 9:
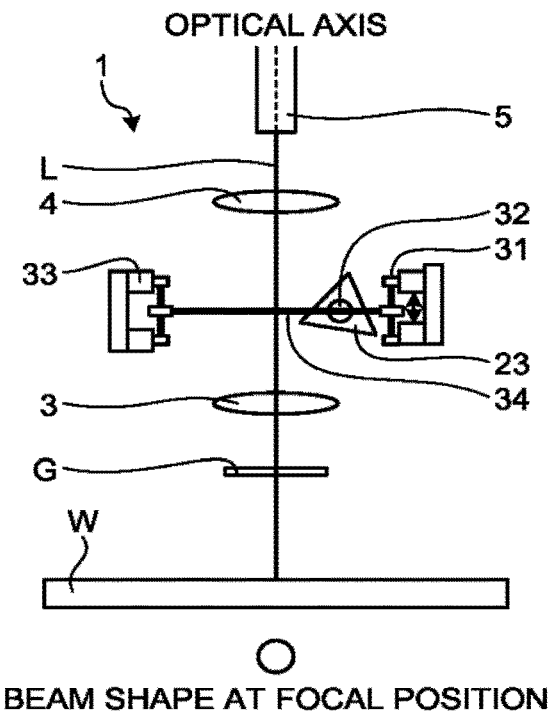
FIG. 9 is a diagram schematically illustrating the machining head of the laser machining apparatus according to the second embodiment of the present invention.

FIGS. 8 and 9 are diagrams schematically illustrating the machining head of a laser machining apparatus according to a second embodiment of the present invention. The laser machining apparatus according to the second embodiment disperses the laser light L using a prism 23 in place of the transmission diffractive optical element 21. The nozzle 2, which is not an optical element, is omitted in FIGS. 8 and 9.

In the laser machining apparatus according to the second embodiment, the laser light L collimated by the collimating lens 4, as in the case with the first embodiment, enters the prism 23. A refractive index of the prism 23 has wavelength dependency; thus, the laser light L having the plurality of wavelengths is dispersed at refraction angles corresponding to the wavelengths after passing through the prism 23. The dispersed components of the laser light L enter the machining lens 3 at incidence angles corresponding to the wavelengths, and the workpiece W is irradiated with beams that spread in the direction of dispersion achieved by the prism 23, as illustrated in FIG. 8.

The distance adjustment mechanism 31 changes a distance from the prism 23 to the machining lens 3 and can thereby change positions in which the components of the laser light L dispersed by wavelength are directed at the machining lens 3. The angle adjustment mechanism 32 changes an inclination of the prism 23 with respect to the laser light L and can thereby change the incidence angles of the components of the laser light L dispersed by wavelength on the machining lens 3.

The rotation mechanism 33 can rotate the prism 23 within a plane perpendicular to the optical axis and thereby change the dispersion direction of the laser light L with respect to the workpiece W.

A switching mechanism 34 is connected to the prism 23 and can move the prism 23 to a position at which the laser light L does not enter the prism 23. When the laser light L does not enter the prism 23 due to the switching mechanism 34, the laser light L is not dispersed by wavelength and is concentrated into one point by the machining lens 3. The switching mechanism 34 enables selection of the state illustrated in FIG. 8 in which the laser light L is dispersed by wavelength when, for example, a thick plate is cut and selection of the state illustrated in FIG. 9 in which the laser light L is not dispersed by wavelength when a thin plate is cut or pierced; thus, the laser machining apparatus according to the second embodiment can perform the machining efficiently. Additionally, the laser machining apparatus according to the second embodiment switches between the state in which the laser light L is dispersed by wavelength and the state in which the laser light L is not dispersed by wavelength may be possible by only moving the prism 23, thereby achieving the switching in a short time and thus enabling improvement in productivity of the overall machining.

The incidence angles and incidence positions of the components of the laser light L dispersed by wavelength on the machining lens 3 can be adjusted by using the distance adjustment mechanism 31 and the angle adjustment mechanism 32; thus, changes of the beam shape and the beam intensity distribution in the workpiece planar direction and the workpiece thickness direction are enabled in accordance with the thickness and material of the workpiece, thereby the machining can be performed efficiently. Additionally, by adjusting the rotation mechanism 33 such that the dispersion direction of the laser light L is consistent with respect to the machining direction, machining can be performed on an arbitrary shape while the machining speed and cutting quality are maintained. The laser light L having the plurality of wavelengths may be dispersed by wavelength by using refraction as described above.

As in the first embodiment, a laser oscillator that generates a plurality of wavelengths or a plurality of laser oscillators each of them generates different wavelengths may be used as the light source of the laser light L such that beams emitted from the oscillator or the oscillators are combined and transmitted to the machining head 1. Alternatively, a laser oscillator that generates a wide laser wavelength spectrum, such as a laser diode, may be used.

The distance adjustment mechanism 31 may be a mechanism that can change the distance from the prism 23 to the machining lens 3; for example, a distance adjustment mechanism 31 may be placed on each of the prism 23 and the machining lens 3 such that the distance from the prism 23 to the machining lens 3 and the distance from the machining lens 3 to the workpiece W may be adjusted individually. A similar effect is produced by changing the position of the laser light L directed at the prism 23 using the switching mechanism 34; thus, the switching mechanism 34 may be used for its pressing amount, in place of the distance adjustment mechanism 31.

The angle adjustment mechanism 32 may be a mechanism configured to change the incidence angle of the laser light L on the prism 23; for example, a reflecting mirror may be placed between the prism 23 and the collimating lens 4, and the angle of the reflecting mirror may be adjusted.

The rotation mechanism 33 may be a mechanism configured to keep the dispersion direction of the laser light L consistent with respect to the machining direction; for example, the rotation mechanism 33 may be placed on the machining head 1 such that the entire machining head 1 is rotated in accordance with the machining direction, or the workpiece W itself may be rotated in accordance with the machining direction.

Third Embodiment

Figure 10:
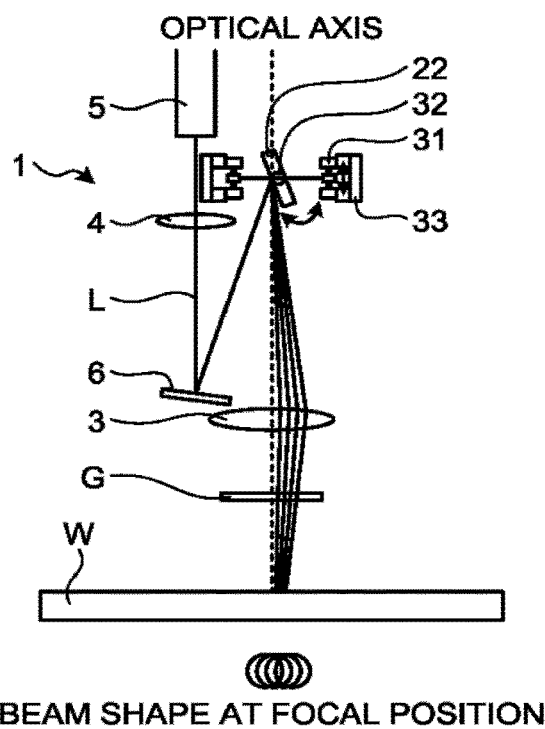
FIG. 10 is a diagram schematically illustrating the machining head of a laser machining apparatus according to a third embodiment of the present invention.
Figure 11:
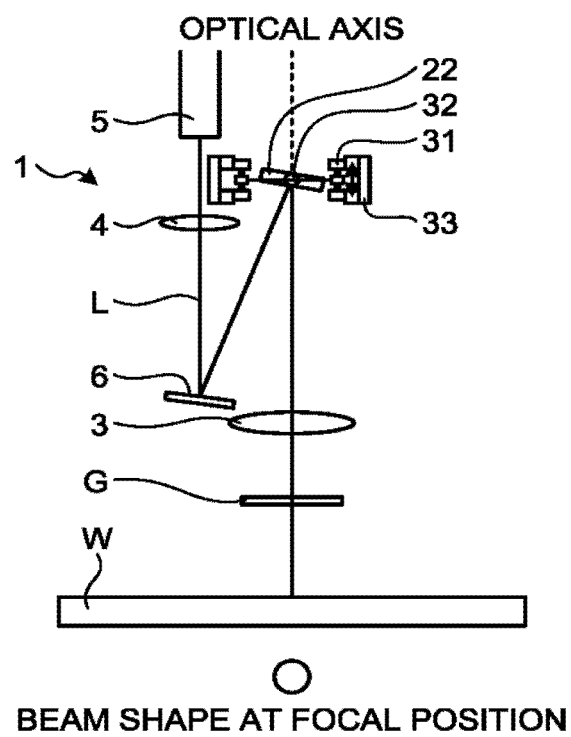
FIG. 11 is a diagram schematically illustrating the machining head of the laser machining apparatus according to the third embodiment of the present invention.

FIGS. 10 and 11 are diagrams schematically illustrating the machining head of a laser machining apparatus according to a third embodiment of the present invention. The nozzle 2, which is not an optical element, is omitted in FIGS. 10 and 11. The laser machining apparatus according to the third embodiment uses a reflection diffractive optical element 22 in place of the transmission diffractive optical element 21.

In the laser machining apparatus according to the third embodiment, the laser light L having the plurality of wavelengths is emitted from the transmission fiber 5 and collimated by the collimating lens 4, which is placed in the machining head 1, as in the case with the first embodiment. The collimated laser light L is reflected by a mirror 6 and directed at the reflection diffractive optical element 22. The laser light L incident on the reflection diffractive optical element 22 is reflected at diffraction angles corresponding to the wavelengths and enters the machining lens 3. In the laser machining apparatus according to the third embodiment, incidence angles on the machining lens 3 differ depending on the wavelengths as in the first embodiment; thus, components of the laser light L that have the respective wavelengths are concentrated at locations corresponding to the respective incidence angles at the focal position of the machining lens 3. As illustrated in FIG. 10, the workpiece W is thus irradiated with beams that spread in a direction of dispersion achieved by the reflection diffractive optical element 22, with the components of the laser light L having the plurality of wavelengths overlapping with each other.

The distance adjustment mechanism 31 can change a distance from the reflection diffractive optical element 22 to the machining lens 3; the angle adjustment mechanism 32 can change an inclination of the reflection diffractive optical element 22; and the rotation mechanism 33 can rotate the entire machining head 1 within a plane perpendicular to the optical axis.

Figure 12:
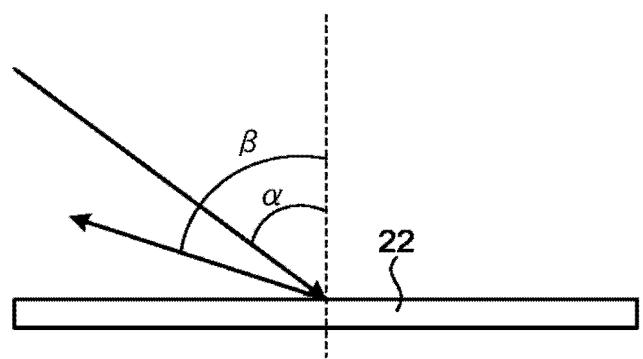
FIG. 12 is a diagram describing definitions of an incidence angle and a diffraction angle of a reflection diffractive optical element of the laser machining apparatus according to the third embodiment.

FIG. 12 is a diagram describing definitions of the incidence angle and the diffraction angle of the reflection diffractive optical element of the laser machining apparatus according to the third embodiment. In discussing the diffraction by the reflection diffractive optical element 22, a relation described in equation (2) below is satisfied when an incidence angle α and a diffraction angle β are defined as angles formed with a normal line to a diffraction grating as described in FIG. 12, with the angles being positive in a counterclockwise direction.

$$\sin \alpha + \sin \beta = Nm\lambda \quad (2)$$

[N: number of slits per 1 mm, m: order of diffraction (=0, ±1, ±2 . . . ), λ: wavelength]

When, for example, m=1 in equation (2) described above, a different diffraction angle β exists for each wavelength; in conditions that no solution exists except m≥1, the reflection diffractive optical element 22 exhibits only mirror reflection with no diffracted light occurring, producing an effect similar to the effect of a mirror. A state illustrated in FIG. 10 is in a condition that the only solution that exists is m=1 in equation (2), that is, a condition that the diffracted light is concentrated on the first order; a state illustrated in FIG. 11 is a condition that the solution of |m|≥1 does not exists. The angle adjustment mechanism 32 can change the incidence angle of the laser light L on the reflection diffractive optical element 22 and thereby switch between the state illustrated in FIG. 10 in which the laser light L is dispersed by wavelength and the state illustrated in FIG. 11 in which the laser light L is not dispersed by wavelength. While the angle adjustment mechanism 32 changes the angle of the reflection diffractive optical element 22 in FIGS. 10 and 11, the angle adjustment mechanism 32 may be placed on the reflecting mirror 6 such that the incidence angle of the laser light L on the reflection diffractive optical element 22 is changed by changing the angle of the reflecting mirror 6. Use of the reflection-type element as described above can reduce absorption of the laser light L by the optical element, thereby inhibiting thermal effect and enabling stable operation.

While a configuration including the laser oscillator 40, which generates a plurality of wavelengths, has been described in the third embodiment, a plurality of laser oscillators each of the laser oscillators generates different wavelength may be used such that beams emitted from each of the oscillators are combined and transmitted to the machining head 1. Alternatively, a laser oscillator that generates a wide laser wavelength spectrum, such as a laser diode, may be used.

The distance adjustment mechanism 31 may be a mechanism that can change the distance from the reflection diffractive optical element 22 to the machining lens 3; for example, a distance adjustment mechanism 31 may be placed on each of the reflection diffractive optical element 22 and the machining lens 3 such that the distance from the reflection diffractive optical element 22 to the machining lens 3 and the distance from the machining lens 3 to the workpiece W are adjusted individually.

The angle adjustment mechanism 32 may be a mechanism configured to change the incidence angle of the laser light L on the reflection diffractive optical element 22; for example, a reflecting mirror may be placed between the reflection diffractive optical element 22 and the collimating lens 4, and the angle of the reflecting mirror may be adjusted.

The rotation mechanism 33 may be a mechanism configured to keep the diffraction direction of the laser light L achieved by the reflection diffractive optical element 22 consistent with respect to the machining direction; for example, the workpiece W itself may be rotated in accordance with the machining direction.

Fourth Embodiment

Figure 13:
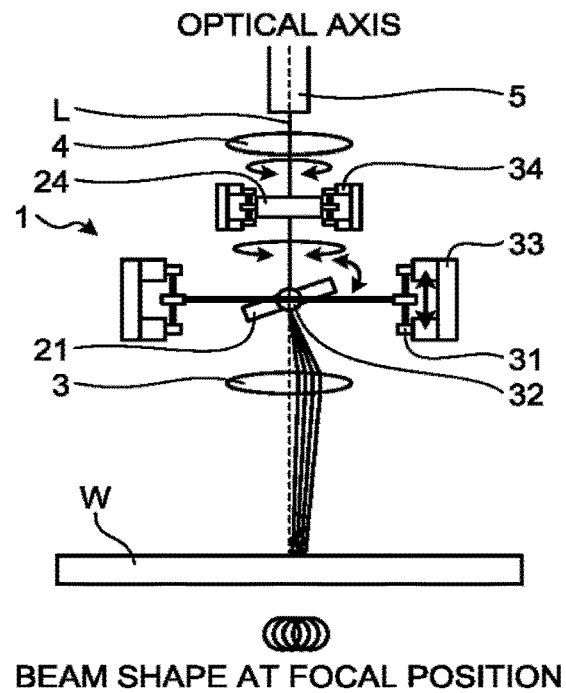
FIG. 13 is a diagram schematically illustrating the machining head of a laser machining apparatus according to a fourth embodiment of the present invention.
Figure 14:
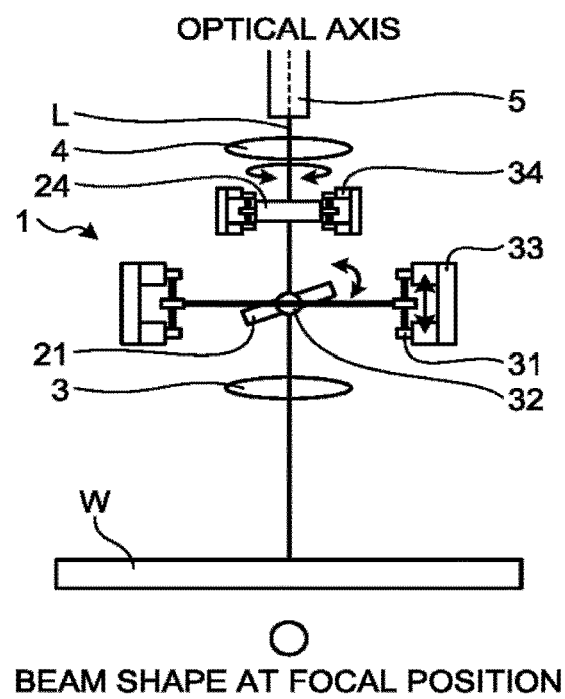
FIG. 14 is a diagram schematically illustrating the machining head of the laser machining apparatus according to the fourth embodiment of the present invention.

FIGS. 13 and 14 are diagrams schematically illustrating the machining head of a laser machining apparatus according to a fourth embodiment of the present invention. The nozzle 2, which is not an optical element, is omitted in FIGS. 13 and 14. The laser machining apparatus according to the fourth embodiment switches, by polarization state control, between the state in which the laser light L having the different wavelengths is dispersed and the state in which the laser light L is not dispersed. In the fourth embodiment, a polarizing plate 24 is used as a polarization control mechanism; after the laser light L emitted from the transmission fiber 5 is collimated by the collimating lens 4, the laser light L is controlled by the polarizing plate 24 so as to be in linear polarization and directed at the transmission diffractive optical element 21. The switching mechanism 34 is placed on the polarizing plate 24 and can rotate the polarizing plate 24 about the optical axis.

A diffractive optical element generally has a structure having grooves oriented to one direction; thus, s-polarization with which the direction of grooves of the diffraction grating is perpendicular to the oscillation direction of electric field vectors exhibits significant difference in diffraction efficiency from that of p-polarization with which the direction of grooves of the diffraction grating is parallel with the oscillation direction of electric field vectors. The diffraction efficiency with respect to each polarization is defined by the laser wavelength and the spacing between grooves in the diffractive optical element.

Thus, as illustrated in FIG. 13, by adjusting a rotation angle of the polarizing plate 24 such that, for example, only a polarization state that leads to high diffraction efficiency of the transmission diffractive optical element 21 is transmitted, components of the laser light L dispersed by the transmission diffractive optical element 21 enter the machining lens 3 at incidence angles corresponding to the wavelengths, and the workpiece W is irradiated with beams that spread in the direction of the dispersion.

As illustrated in FIG. 14, by adjusting the rotation angle of the polarizing plate 24 such that only a polarization state that leads to zero diffraction efficiency of the transmission diffractive optical element 21 is transmitted, the laser light L enters the machining lens 3 without being dispersed by the transmission diffractive optical element 21, and the workpiece W is irradiated with the laser light L concentrated into one point.

The distance adjustment mechanism 31 changes the distance from the transmission diffractive optical element 21 to the machining lens 3 and can thereby change positions in which the components of the laser light L dispersed by wavelength are directed at the machining lens 3. The angle adjustment mechanism 32 changes the inclination of the transmission diffractive optical element 21 with respect to the laser light L and can thereby change the incidence angles of the components of the laser light L dispersed by wavelength on the machining lens 3.

The rotation mechanism 33 can rotate the polarizing plate 24 and the transmission diffractive optical element 21 within planes perpendicular to the optical axis with the positional relationship between the two is maintained, and thereby can change the dispersion direction of the laser light L with respect to the workpiece W.

When the polarization state of the laser light L having the plurality of wavelengths, directed at the collimating lens 4, is linear polarization, a half-wave plate may be used in place of the polarizing plate 24 so as to control the polarization state by the rotation of the half-wave plate and thereby switch the dispersion of the laser light L achieved by the transmission diffractive optical element 21.

Figure 15:
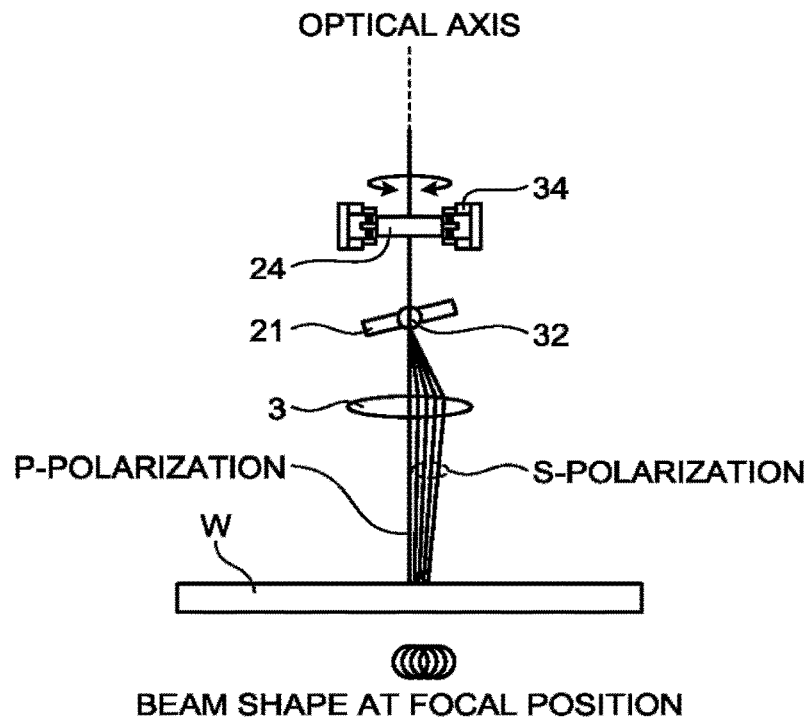
FIG. 15 is a diagram illustrating a state exhibited when a rotation angle of a polarizing plate is adjusted to an angle at which p-polarization and s-polarization are both present with respect to the transmission diffractive optical element of the laser machining apparatus according to the fourth embodiment.
Figure 16:
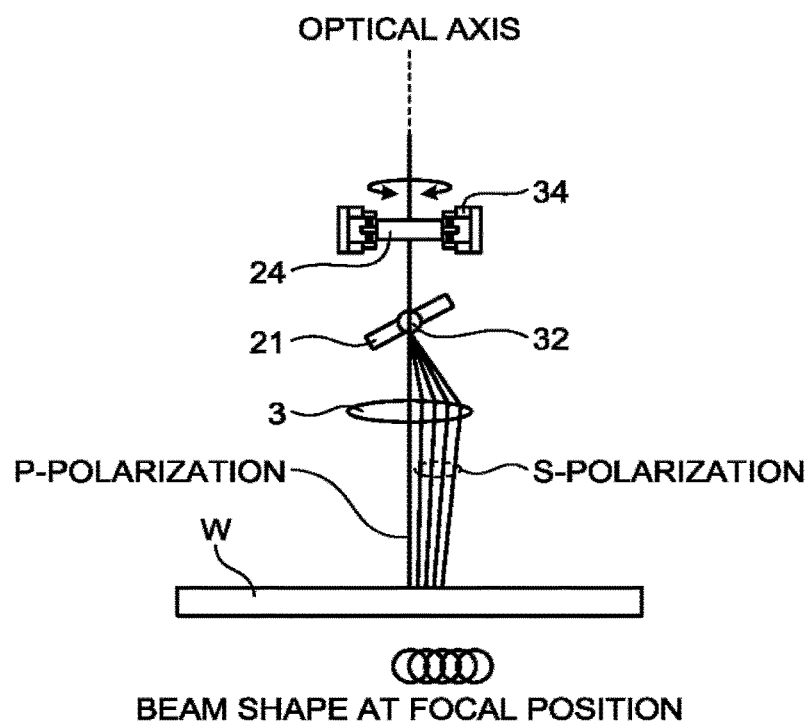
FIG. 16 is a diagram illustrating a state exhibited when the rotation angle of the polarizing plate is adjusted to the angle at which p-polarization and s-polarization are both present with respect to the transmission diffractive optical element of the laser machining apparatus according to the fourth embodiment.

FIGS. 15 and 16 are diagrams illustrating states exhibited when the rotation angle of the polarizing plate is adjusted to angles, at which p-polarization and s-polarization are both present, with respect to the transmission diffractive optical element of the laser machining apparatus according to the fourth embodiment. Since the p-polarization and the s-polarization are both present with respect to the transmission diffractive optical element 21, the p-polarization just travels without being diffracted while the s-polarization is dispersed before entering the machining lens 3 as illustrated in FIG. 15, resulting in p-polarization components generating beams on the optical axis and s-polarization components generating beams that spread in the direction of the dispersion at the focal position. As illustrated in FIG. 16, a rotation angle of the transmission diffractive optical element 21 greater than that illustrated in FIG. 15 results in irradiation beams that spread wider than that of FIG. 15. An intensity ratio between the p-polarization components and the s-polarization components that are incident on the transmission diffractive optical element 21 can be further adjusted by adjusting the rotation angle of the polarizing plate 24; thus, the beam intensity ratio at the focal position can be adjusted.

Figure 17:
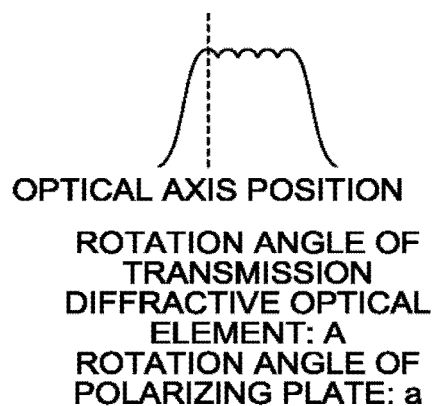
FIG. 17 is a diagram illustrating an example of a beam intensity ratio at the focal position exhibited when a rotation angle of the transmission diffractive optical element and the rotation angle of the polarizing plate are changed in the laser machining apparatus according to the fourth embodiment.
Figure 18:
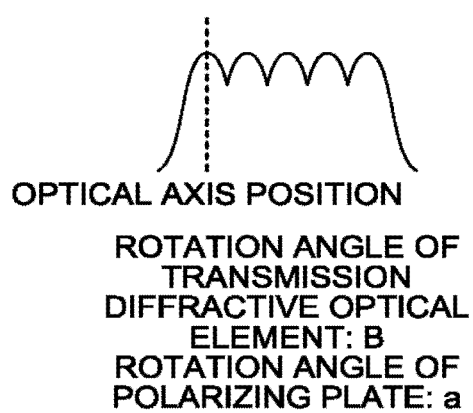
FIG. 18 is a diagram illustrating an example of the beam intensity ratio at the focal position exhibited when the rotation angle of the transmission diffractive optical element and the rotation angle of the polarizing plate are changed in the laser machining apparatus according to the fourth embodiment.
Figure 19:
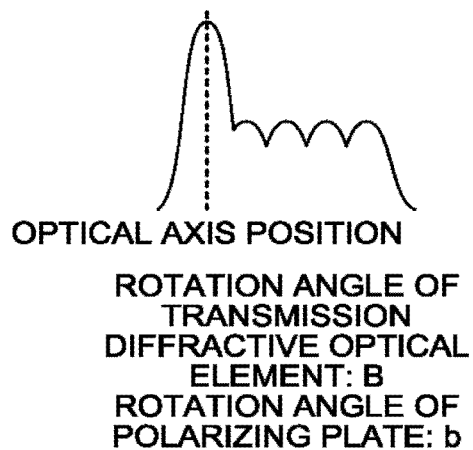
FIG. 19 is a diagram illustrating an example of the beam intensity ratio at the focal position exhibited when the rotation angle of the transmission diffractive optical element and the rotation angle of the polarizing plate are changed in the laser machining apparatus according to the fourth embodiment.
Figure 20:
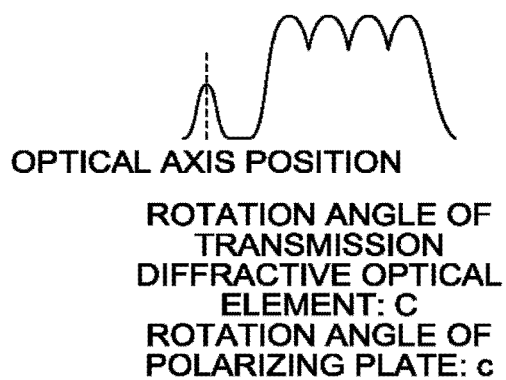
FIG. 20 is a diagram illustrating an example of the beam intensity ratio at the focal position exhibited when the rotation angle of the transmission diffractive optical element and the rotation angle of the polarizing plate are changed in the laser machining apparatus according to the fourth embodiment.

FIGS. 17, 18, 19, and 20 are diagrams illustrating examples of the beam intensity ratio at the focal position exhibited when the rotation angle of the transmission diffractive optical element and the rotation angle of the polarizing plate are changed in the laser machining apparatus according to the fourth embodiment. In FIGS. 17, 18, 19, and 20, a leading side of the machining direction is to the left of the drawing plane, and a rear side of the machining direction is to the right of the drawing plane. When a rotation angle of the transmission diffractive optical element 21 is denoted by A and a rotation angle of the polarizing plate 24 that causes the sum of the p-polarization components at each wavelength and the s-polarization components at each wavelength to have equal proportions in a beam intensity ratio at the focal position is denoted by a, a beam intensity distribution as illustrated in FIG. 17 is exhibited. If the rotation angle of the transmission diffractive optical element 21 is increased in this state from A to B, dispersion of the s-polarization components increases; thus, beams that spread in the dispersion direction as illustrated in FIG. 18 are generated. If the rotation angle of the polarizing plate 24 is also changed to b such that the p-polarization components are increased, beams having high intensity at the optical axis position and low intensity in dispersed positions are obtained as illustrated in FIG. 19. With the intensity distribution as illustrated in FIG. 19, energy can be concentrated at the optical axis position; thus, machining speed increases while the machining quality can be maintained because the dispersed beams can prevent temperatures of dross from decreasing. If the rotation angle of the polarizing plate 24 is further changed in the state illustrated in FIG. 18 to c such that the p-polarization components are reduced and the s-polarization components are increased, beams having low beam intensity at the optical axis position and high beam intensity in the dispersion direction are obtained. If the rotation angle of the transmission diffractive optical element 21 is further increased from B to C, beams having low beam intensity in a first half in the machining direction and high beam intensity in a latter half are obtained as illustrated in FIG. 20. In this case, a beam portion having the low beam intensity is used to melt only a surface of the workpiece W, and a beam portion having the high beam intensity in the latter half is used to cut the workpiece W. By melting the surface of the workpiece W before cutting in this manner, machining can be performed with consistent quality regardless of a state of the surface of the workpiece W, such as corrosion and a flaw.

The distance adjustment mechanism 31 may be a mechanism that can change the distance from the transmission diffractive optical element 21 to the machining lens 3; for example, a distance adjustment mechanism 31 may be placed on each of the transmission diffractive optical element 21 and the machining lens 3 such that the distance from the transmission diffractive optical element 21 to the machining lens 3 and the distance from the machining lens 3 to the workpiece W are adjusted individually.

The angle adjustment mechanism 32 may be a mechanism configured to change the incidence angle of the laser light L on the transmission diffractive optical element 21; for example, a reflecting mirror may be placed between the transmission diffractive optical element 21 and the collimating lens 4, and the angle of the reflecting mirror may be adjusted.

The rotation mechanism 33 may be a mechanism configured to keep the diffraction direction of the laser light L achieved by the transmission diffractive optical element 21 consistent with respect to the machining direction; for example, the rotation mechanism 33 may be placed on the machining head 1 such that the entire machining head 1 is rotated in accordance with the machining direction, or the workpiece W itself may be rotated in accordance with the machining direction. The laser light L that has passed through the transmission diffractive optical element 21 is in linear polarization; machining quality has polarization dependency. Since the dispersion direction of the laser light L can be adjusted by the rotation mechanism 33 arbitrarily, machining can be performed with increased efficiency in accordance with the machining purpose by, for example, aligning the laser light L with the machining direction so as to perform the machining with increased speed and by causing the dispersion direction of the laser light L to be orthogonal to the machining direction so as to perform the machining with increased quality.

The laser machining apparatus according to the fourth embodiment enables quick switching between a beam shape suitable for cutting a thin plate and making a hole and a beam shape suitable for cutting a thick plate.

Fifth Embodiment

Figure 21:
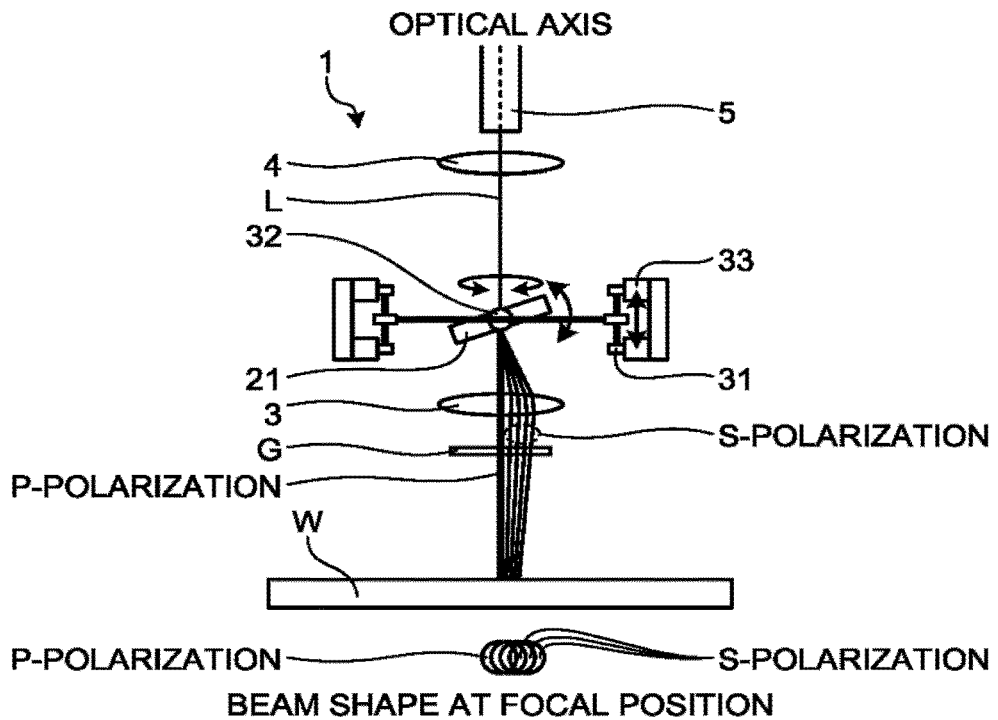
FIG. 21 is a diagram schematically illustrating the machining head of a laser machining apparatus according to a fifth embodiment of the present invention.
Figure 22:
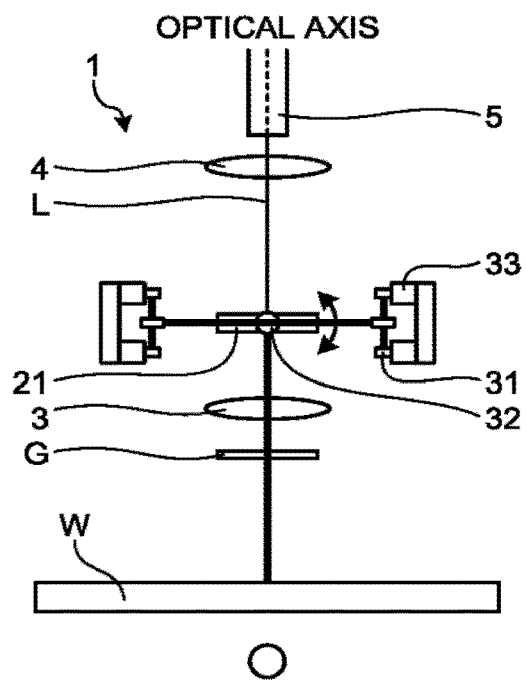
FIG. 22 is a diagram schematically illustrating the machining head of the laser machining apparatus according to the fifth embodiment of the present invention.

FIGS. 21 and 22 are diagrams schematically illustrating the machining head of a laser machining apparatus according to a fifth embodiment of the present invention. The laser machining apparatus according to the fifth embodiment disperses the wavelength of the laser light L having the plurality of wavelengths by diffracting a part of the laser light L and transmitting a part of the laser light L as it is; this is on the basis of observation of polarization dependency of the diffraction efficiency of the transmission diffractive optical element 21.

In FIGS. 21 and 22, the laser light L having the plurality of wavelengths is emitted from the transmission fiber 5 into the machining head 1, collimated by the collimating lens 4, and enters the transmission diffractive optical element 21, similarly as in the first embodiment. The distance adjustment mechanism 31 can change the distance from the transmission diffractive optical element 21 to the machining lens 3; the angle adjustment mechanism 32 can change the inclination of the transmission diffractive optical element 21 with respect to the laser light L; and the rotation mechanism 33 can rotate the transmission diffractive optical element 21 within a plane perpendicular to the optical axis.

While the diffraction efficiency of a diffractive optical element differs depending on a polarization state of the laser light L, the diffraction efficiency is not consistent with respect to each polarization, varying with the diffraction grating period of the diffractive optical element, the laser wavelength, and the incidence angle of the laser light L on the diffractive optical element. Here, if the laser light L incident on the transmission diffractive optical element 21 is of random polarizations, the p-polarization components of the laser light L enter the machining lens 3 perpendicularly and the s-polarization components of the laser light L enter the machining lens 3 at incidence angles corresponding to the wavelengths as in FIG. 21, in a condition in which, for example, the diffraction efficiency of the p-polarization is low and the diffraction efficiency of the s-polarization is high. The workpiece W is thus irradiated with beams including the p-polarization components on the optical axis and the s-polarization components spreading in the dispersion direction of the laser light L. By adjusting the angle adjustment mechanism 32 such that the condition that the solution of |m|≥1 does not exist is satisfied in equation (1) described in the first embodiment, the workpiece W is irradiated with beams concentrated into one point as illustrated in FIG. 22. Thus, when the state of FIG. 21 and the state of FIG. 22 are switched by the angle adjustment mechanism 32, the irradiation position of the p-polarization components does not change and hence machining can be swiftly performed after switching. This means that, for example, piercing can be performed in the state of FIG. 22 during the process of cutting a thick plate and, as soon as the piercing is completed, the state can be switched to the state of FIG. 21 so that the machining is performed continuously; thus, productivity of the overall machining is improved.

While the transmission diffractive optical element 21 is used for dispersing the laser light L by wavelength in the fifth embodiment, the reflection diffractive optical element 22 may be used.

Sixth Embodiment

Figure 23:
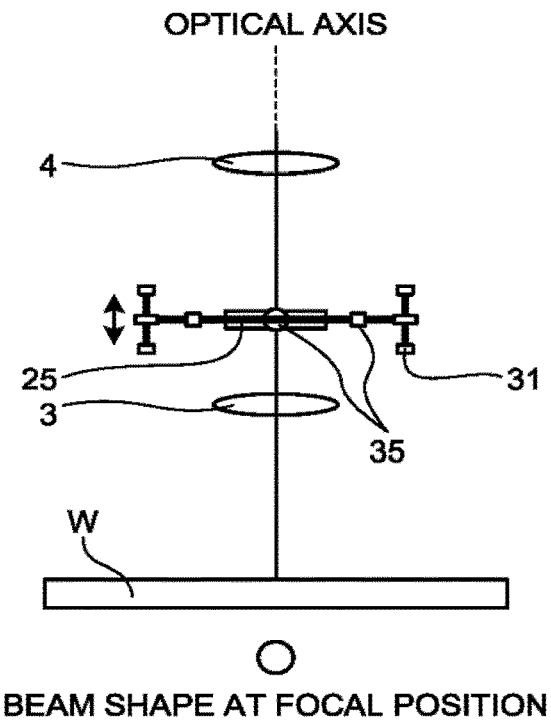
FIG. 23 is a diagram schematically illustrating the machining head of a laser machining apparatus according to a sixth embodiment of the present invention.
Figure 24:
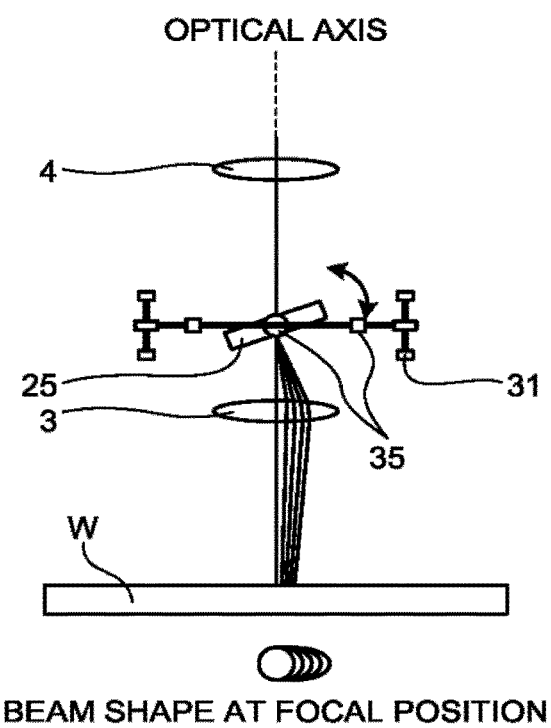
FIG. 24 is a diagram schematically illustrating the machining head of the laser machining apparatus according to the sixth embodiment of the present invention.
Figure 25:
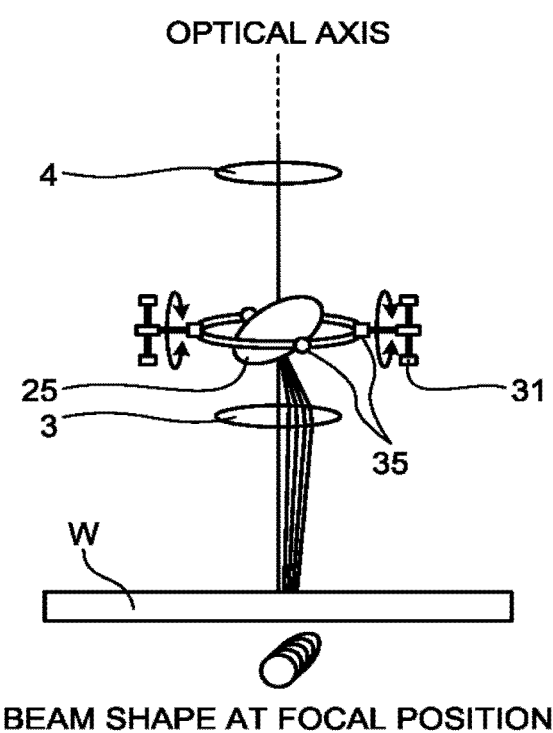
FIG. 25 is a diagram schematically illustrating the machining head of the laser machining apparatus according to the sixth embodiment of the present invention.

FIGS. 23, 24, and 25 are diagrams schematically illustrating the machining head of a laser machining apparatus according to a sixth embodiment of the present invention. In the laser machining apparatus according to the sixth embodiment, the laser light L having the plurality of wavelengths is collimated by the collimating lens 4 similarly as in the first embodiment, and enters a center portion of a transmission diffractive optical element 25 that has a concentric diffraction pattern. A double-axis angle adjustment mechanism 35 having, as rotation center axes, two orthogonal axes within a plane perpendicular to the optical axis of the laser light L incident on the transmission diffractive optical element 25 is placed on the transmission diffractive optical element 25 and can adjust the transmission diffractive optical element 25 to any angle with respect to the plane perpendicular to the optical axis. As in the case with the first embodiment, the transmission diffractive optical element 25 is a mechanism movable in an optical axis direction by the distance adjustment mechanism 31. The nozzle 2, the transmission fiber 5, and the protective glass G, which are not pertinent to the dispersion of the laser light L, are omitted in FIGS. 23, 24, and 25.

A state in which the laser light L is not dispersed is illustrated in FIG. 23; a beam is concentrated into one point at the focal position. A state in which the transmission diffractive optical element 25 is inclined in only one axis direction from the state of FIG. 23 is illustrated in FIG. 24; the laser light L is dispersed by wavelength in accordance with an inclination direction and enters the machining lens 3. Since the transmission diffractive optical element 25 has the concentric diffraction pattern, components of the laser light L that are in the inclination direction of the transmission diffractive optical element 25 are dispersed the most. The beam shape at the focal position thus has a shape dispersed with respect to the inclination direction of the transmission diffractive optical element 25 as illustrated in FIG. 24. A state in which the transmission diffractive optical element 25 is inclined in the other one axis direction from the state of FIG. 24 is illustrated in FIG. 25. Components of the laser light L that are in the inclination direction of the transmission diffractive optical element 25 are also dispersed the most as in the case with FIG. 24; thus, the beam shape at the focal position thus has a shape dispersed in the inclination direction of the transmission diffractive optical element 25 with respect to the beam shape in FIG. 24.

As described above, the laser machining apparatus according to the sixth embodiment can change an extension direction of a beam shape at the focal position arbitrarily within a plane perpendicular to the optical axis by the rotation about the two independent axes of the double-axis angle adjustment mechanism 35, thereby enabling the beam shape to be dispersed in an appropriate direction with respect to the machining direction. While the laser machining apparatus according to the first embodiment necessitates 90 degrees or more rotation of the transmission diffractive optical element 21 itself using the rotation mechanism 33 illustrated in FIGS. 6 and 7 in order to machine a shape having an acute angle, the laser machining apparatus according to the sixth embodiment can cause the dispersion direction of a beam to follow the machining direction by only adjusting the inclination angle of the transmission diffractive optical element 25, which has the concentric diffraction pattern, when the machining direction is turned, thereby enabling improved following capability with respect to a shape to be machined and thus enabling enhanced productivity.

The structure of the double-axis angle adjustment mechanism 35 according to the sixth embodiment is not limited to that illustrated in FIGS. 23, 24, and 25; a structure that includes a portion for holding an optical element and adjusts the angle using the portion by its pushing-out amount, resembling a double-axis gimbal type mirror holder, may be used.

While sheet metal cutting has been mainly described in the first to sixth embodiments, the laser machining apparatus according to the first to sixth embodiments may be used for welding. In the first to sixth embodiments, the beam shape and intensity distribution can be changed with respect to the workpiece planar direction; since the beam shape can be adjusted with respect to the machining direction arbitrarily, the welding width can be changed in accordance with intended purposes and, thus, welding can be performed efficiently.

Piercing may be performed while the rotation mechanism 33 of the laser machining apparatus according to the first to sixth embodiments is rotated. For example, by performing piercing with spread beams as illustrated in FIG. 2 while the rotation mechanism 33 is rotated, a hole having a diameter larger than that usually formed in piercing can be made and thereby the speed of piercing in a thick plate can be improved. While the transmission fiber 5 is used as a transmission optical element from the laser oscillator 40 to the machining head 1 in FIGS. 1, 2, 3, 8, 9, 10, 11, 13, 14, 21, and 22, mirror transmission may be used for the transmission optical element, or the mirror transmission and fiber transmission may be used in combination.

The configurations in the embodiments described above represent some examples of the present invention, and they can be combined with another publicly known technique and partially omitted or modified without departing from the spirit of the present invention.

REFERENCE SIGNS LIST 1 machining head; 2 nozzle; 3 machining lens; 4 collimating lens; 5 transmission fiber; 6 reflecting mirror; 21, 25 transmission diffractive optical element; 22 reflection diffractive optical element; 23 prism; 24 polarizing plate; 31 distance adjustment mechanism; 32 angle adjustment mechanism; 33 rotation mechanism; 34 switching mechanism; 35 double-axis angle adjustment mechanism; 40 laser oscillator.

The invention claimed is:

1. A laser machining head, comprising:
a diffractive optical element to allow laser light, having a plurality of wavelengths and emitted from a laser oscillator, to pass through the diffractive optical element;
a machining lens to concentrate the laser light that has passed through the diffractive optical element; and
an angle adjuster to change an angle of the diffractive optical element,
wherein the angle adjuster switches between presence and absence of dispersion of the laser light incident on the machining lens.

2. The laser machining head according to claim 1, further comprising a rotator to rotate the diffractive optical element about, as a rotation axis, an optical axis of the laser light incident on the diffractive optical element.

3. The laser machining head according to claim 1, wherein the diffractive optical element is a transmission diffractive optical element, and
a polarization controller to adjust an intensity ratio between a p-polarization component and an s-polarization component of the laser light incident on the transmission diffractive optical element is included.

4. A laser machining head, comprising:
a prism to allow laser light, having a plurality of wavelengths and emitted from a laser oscillator, to enter the prism;
a machining lens to concentrate the laser light;
a distance adjuster to change a distance between the prism and the machining lens;
a switch to switch between a state of the prism being in a position that allows the laser light to enter the prism and a position that does not allow the laser light to enter the prism to switch between presence and absence of dispersion of the laser light incident on the machining lens; and
a rotator to rotate the prism about, as a rotation axis, an optical axis of incident light on the prism.

5. The laser machining head according to claim 1, further comprising a distance adjuster to change a distance between the diffractive optical element and the machining lens.

6. A laser machining head, comprising:
a diffractive optical element to allow laser light, having a plurality of wavelengths and emitted from a laser oscillator, to pass through the diffractive optical element;
a machining lens to concentrate the laser light that has passed through the diffractive optical element; and
an angle adjuster to change an angle of the diffractive optical element,
wherein the diffractive optical element has a concentric diffraction pattern and the laser light enters a center portion of the concentric diffraction pattern of the diffractive optical element, and
wherein the angle adjuster is a double-axis angle adjuster to enable the diffractive optical element to rotate about, as rotation center axes, two axes orthogonal to each other and located within a plane that intersects with the diffractive optical element and with an optical axis of the laser light incident on the diffractive optical element, the plane being perpendicular to the optical axis.

7. A laser machining apparatus, comprising:
a laser machining head according to claim 1; and
the laser oscillator.

8. A laser machining apparatus, comprising:
a laser machining head according to claim 4; and
the laser oscillator.

* * * * *